(12) United States Patent
Bundy

(10) Patent No.: US 7,127,422 B1
(45) Date of Patent: Oct. 24, 2006

(54) LATENCY MONITOR

(75) Inventor: Michael Bundy, Katy, TX (US)

(73) Assignee: ETP Holdings, Inc., New York, NY (US)

( * ) Notice: Subject to any disclaimer, the term of this patent is extended or adjusted under 35 U.S.C. 154(b) by 0 days.

(21) Appl. No.: 09/574,595

(22) Filed: May 19, 2000

(51) Int. Cl.
G06F 17/60 (2006.01)
(52) U.S. Cl. ..................... 705/36 R; 705/35
(58) Field of Classification Search .......... 705/35–37
See application file for complete search history.

(56) References Cited

U.S. PATENT DOCUMENTS

| | | |
|---|---|---|
| 3,573,747 A | 4/1971 | Adams et al. |
| 3,581,072 A | 5/1971 | Nymeyer |
| 3,976,840 A | 8/1976 | Cleveland et al. |
| 4,243,844 A | 1/1981 | Waldman |
| 4,412,287 A | 10/1983 | Braddock, III |
| RE31,643 E | 8/1984 | Waldman |
| 4,585,130 A | 4/1986 | Brennan |
| 4,588,192 A | 5/1986 | Laborde |
| 4,674,044 A | 6/1987 | Kalmus et al. |
| 4,677,552 A | 6/1987 | Sibley, Jr. |
| 4,750,135 A | 6/1988 | Boilen |
| 4,751,640 A | 6/1988 | Lucas et al. |
| 4,903,201 A | 2/1990 | Wagner |
| 4,949,248 A | 8/1990 | Caro |
| 5,025,372 A | 6/1991 | Burton et al. |
| 5,038,284 A | 8/1991 | Kramer |
| 5,101,353 A | 3/1992 | Lupien et al. |
| 5,136,501 A | 8/1992 | Silverman et al. |
| 5,168,446 A | 12/1992 | Wiseman |
| 5,267,148 A | 11/1993 | Kosaka et al. |
| 5,270,922 A | 12/1993 | Higgins |
| 5,297,031 A | 3/1994 | Gutterman et al. |
| 5,297,032 A | 3/1994 | Trojan et al. |
| 5,339,392 A | 8/1994 | Risberg et al. |

(Continued)

FOREIGN PATENT DOCUMENTS

JP 07076155 A * 3/1995

OTHER PUBLICATIONS

Schmerken, Ivy (Wall Street & Technology 23, 12, 17(3)) Direct from the source: Brokerage firm E-speed Equities taps direct ECN order book data feeds through a hosted Solution, (Dec. 2005).*

Primary Examiner—Hani M. Kazimi
Assistant Examiner—Narayanswamy Subramanian
(74) Attorney, Agent, or Firm—Conley Rose, P.C.

(57) ABSTRACT

Method and system for displaying latency, useful in broker-dealer computer systems engaged generally in automated processing of orders for securities including sending to markets messages comprising orders and cancellations and receiving from markets responses to orders and cancellations, including recording for messages sent to markets the time when each message is sent and the identity of the market to which each message is sent, including recording for responses received from markets the time when each response is received, wherein each response corresponds to a particular message. Embodiments include calculating latencies for markets dependent upon recorded time when a message is sent to the market and a recorded time when a corresponding response is received from the market. Latencies are embodied alternatively as instant values or various kinds of averages. Embodiments includes latencies for communications ports as well as for markets. Embodiments include counting messages and responses for markets and for ports, and displaying the counts. Embodiments include displaying the identity of the markets and the latencies for the markets.

15 Claims, 7 Drawing Sheets

U.S. PATENT DOCUMENTS

| | | |
|---|---|---|
| 5,361,199 A | 11/1994 | Shoquist et al. |
| 5,375,055 A | 12/1994 | Togher et al. |
| 5,500,889 A | 3/1996 | Baker et al. |
| 5,508,913 A | 4/1996 | Yamamoto et al. |
| 5,517,406 A | 5/1996 | Harris et al. |
| 5,557,517 A | 9/1996 | Daughterty, III |
| 5,563,783 A | 10/1996 | Stolfo et al. |
| 5,640,569 A | 6/1997 | Miller et al. |
| 5,655,088 A | 8/1997 | Midorikawa et al. |
| 5,689,652 A | 11/1997 | Lupien et al. |
| 5,727,165 A | 3/1998 | Ordish et al. |
| 5,752,237 A | 5/1998 | Cherny |
| 5,774,880 A | 6/1998 | Ginsberg |
| 5,788,234 A | 8/1998 | Siofer |
| 5,799,287 A | 8/1998 | Dembo |
| 5,806,048 A | 9/1998 | Kiron et al. |
| 5,809,483 A | 9/1998 | Broka et al. |
| 5,819,237 A | 10/1998 | Garman |
| 5,819,238 A | 10/1998 | Fernholz |
| 5,845,266 A | 12/1998 | Lupien et al. |
| 5,852,808 A | 12/1998 | Cherny |
| 5,857,176 A | 1/1999 | Ginsberg |
| 5,864,827 A * | 1/1999 | Wilson .................. 705/35 |
| 5,875,108 A | 2/1999 | Hoffberg et al. |
| 5,901,246 A | 5/1999 | Hoffberg et al. |
| 5,905,974 A | 5/1999 | Fraser et al. |
| 5,915,245 A * | 6/1999 | Patterson et al. ............. 705/35 |
| 5,924,083 A | 7/1999 | Silverman et al. |
| 5,940,810 A | 8/1999 | Traub et al. |
| 5,946,667 A | 8/1999 | Tull, Jr. et al. |
| 5,950,176 A | 9/1999 | Keiser et al. |
| 6,035,389 A * | 3/2000 | Grochowski et al. ....... 712/216 |
| 6,272,539 B1 * | 8/2001 | Cuomo et al. ............. 709/223 |
| 6,963,855 B1 * | 11/2005 | Borzenko .................. 705/37 |
| 6,975,656 B1 * | 12/2005 | Madhavapeddi et al. ... 370/518 |
| 6,993,578 B1 * | 1/2006 | Dmitroca .................. 709/224 |

* cited by examiner

LATENCY MONITOR — 506

| MARKET (118) | INSTANT LATENCY (502) | AVERAGE LATENCY (504) |
|---|---|---|
| ISLD | 1.0 | 0.7 |
| ARCH | 2.2 | 1.8 |
| BTRD | 1.7 | 2.2 |
| INST | 15.0 | 17.2 |

*FIG. 5A*

LATENCY MONITOR — 508

| MARKET (118) | PORT (154) | INSTANT LATENCY (202) | AVERAGE LATENCY (320) | SENT MESSAGES (144) | RECD MESSAGES (146) |
|---|---|---|---|---|---|
| ISLD | 010 | 1.0 | 0.7 | 123 | 127 |
| ISLD | 020 | 1.2 | 0.8 | 140 | 145 |
| ARCH | 010 | 2.3 | 2.0 | 70 | 80 |
| ARCH | 020 | 2.5 | 2.2 | 75 | 78 |
| INST | 010 | 15.0 | 18.1 | 5 | 8 |
| INST | 020 | 17.3 | 17.5 | 4 | 7 |
| INST | 030 | 18.7 | 19.2 | 6 | 6 |

*FIG. 5B*

LATENCY MONITOR — 510

| MARKET (118) | LATENCY (320) | SENT MESSAGES (144) | RECD MESSAGES (146) |
|---|---|---|---|
| ISLD | 1.0 | 125 | 130 |
| ARCH | 2.0 | 62 | 60 |
| BTRD | 2.5 | 48 | 52 |

*FIG. 5C*

LATENCY MONITOR

BACKGROUND

Broker-dealers increasingly make available to their customers on-line submission, cancellation, and tracking of the status of orders for securities. Securities trading customers include day traders, institutions, and active private investors. Such customers make many quick decisions regarding when and from whom to order securities. Customers are increasingly demanding regarding quality and speed of execution. Customers require a high quality of information to support their decision-making. Customers are often presented with quotes identifying markets from which particular securities can be bought or sold at particular prices. In such quotes there are often several markets quoting securities at the current inside price. Markets quoting the same price, however, are not the same in terms of quality of execution. Especially regarding speed, all markets are different. It would be useful, therefore, if customers had a display of information helpful in identifying which markets are likely to execute orders more quickly than others.

Modern broker-dealers often subscribe to one or more exchanges or ECNs ("markets") capable of executing orders for securities by matching orders with orders of opposite side. Orders, cancellations, and responses are communicated to and from markets by use of data communications ports. Many broker-dealers handle volumes of orders so large as to require more than one port per market. Ports often are not equal in their ability to communicate with a particular market. Sometimes ports fail, partially or completely. It would be useful to have a display of information, for diagnostic purposes within the broker-dealer organizations, to help identify problems with particular ports, to help keep the overall flow of data communications functioning efficiently.

SUMMARY

One aspect of the invention provides methods for displaying latency. Embodiments of the invention are typically implemented in broker-dealer computer systems engaged generally in automated processing of orders for securities including sending to markets messages comprising orders and cancellations and receiving from markets responses to orders and cancellations. Embodiments include recording for messages sent to markets the time when each message is sent and the identity of the market to which each message is sent. Embodiments include recording for responses received from markets the time when each response is received, wherein each response corresponds to a particular message. Embodiments include calculating latencies for markets dependent upon recorded time when a message is sent to the market and a recorded time when a corresponding response is received from the market. Embodiments include latencies for ports as well as latencies for markets. Embodiments include displaying the identity of the markets and the latencies for the markets. Embodiments include counting and displaying the number of messages and responses received and sent during a period of time, for use in broker-dealer diagnostics.

A second aspect of the invention provides automated computing machinery, as system for calculating and displaying latency, typically implemented in broker-dealer computer systems capable of automated processing of orders for securities, includes sending messages to markets and receiving from markets responses to messages. Embodiments of this aspect include at least one computer processor programmed to record in computer memory, for messages sent to markets, the time when each message is sent and the identity of the market to which each message is sent. In such embodiments, processors are typically programmed also to record in computer memory, for responses received from markets, the time when each response is received. Each response corresponds to a particular message. In such embodiments, processors are programmed also to calculate for markets latencies dependent upon recorded time when at least one message is sent to a market and recorded time when a corresponding response is received from the market. In such embodiments, processors typically are programmed also to display the identities of the markets and the latencies for the markets. Embodiments include latencies for ports as well as latencies for markets. Embodiments of this aspect typically include computer memory coupled to processors, the processors being further programmed to store in computer memory the latencies. Embodiments include processors programmed to count and display the number of messages and responses received and sent during a period of time, for use in broker-dealer diagnostics.

DRAWINGS

FIG. 5A illustrates a form of display.

FIG. 5B illustrates an alternative form of display.

FIG. 5C illustrates an alternative form of display.

DETAILED DESCRIPTION OF EXEMPLARY EMBODIMENTS

Figure 1A:
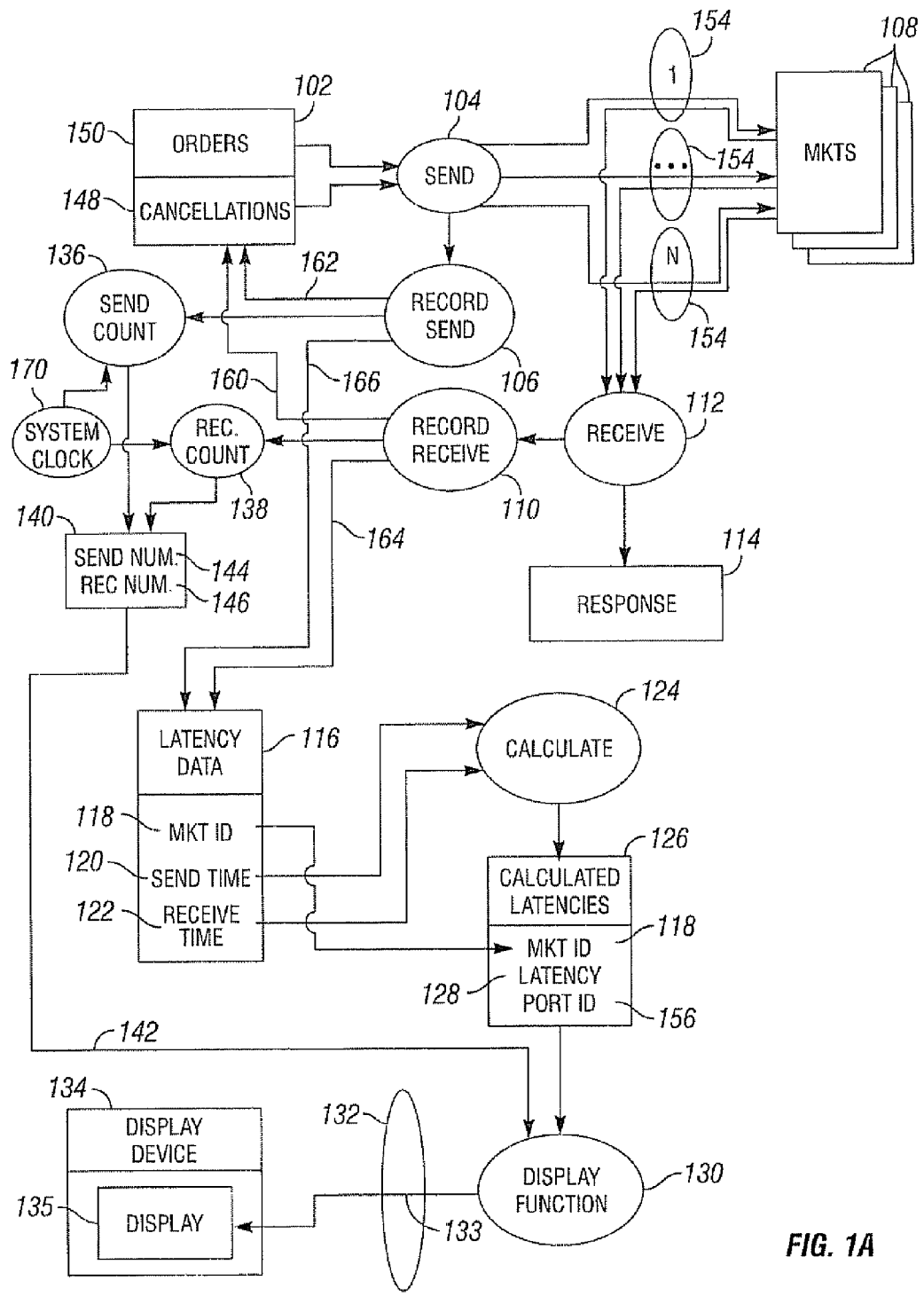
FIG. 1A is a general data flow diagram showing various alternative embodiments of the invention.
Figure 1B:
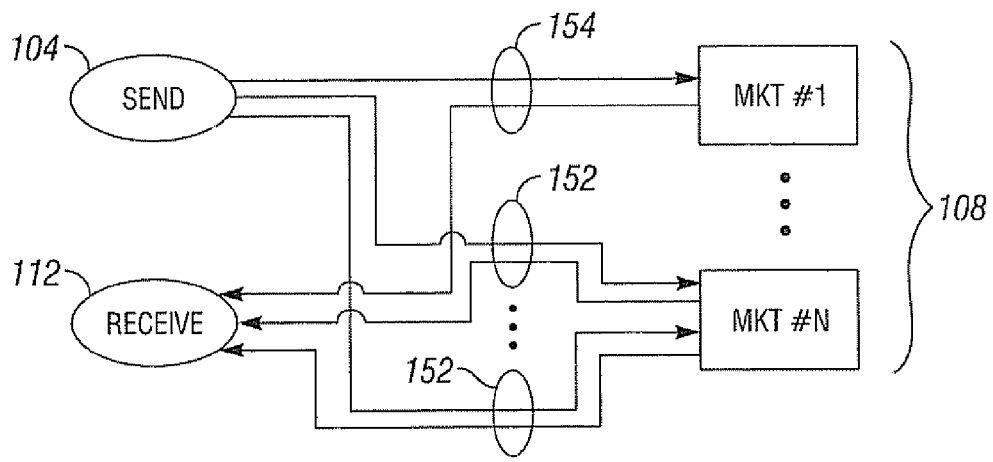
FIG. 1B is a detail of relations among ports and markets in various alternative embodiments of the invention.

Definitions:

"Cancellation" is termination of an order, or partial termination of an order, by the customer or by software comprising an embodiment of the invention. In addition, markets can cancel orders, or parts of orders, for example, in response to an IOC order.

"ECN" abbreviates "Electronic Communications Network," referring to an order matching service that provides liquidity by matching orders rather than by maintaining inventory. In the context of the invention, ECNs are considered markets. ECNs, like market makers are identified by use of market participant identification codes or "MPIDs." In order to avoid confusion with data communications networks, ECNs are referred to as either "ECNs" or as "markets." Some current ECNs, their symbols and names, are listed below. The number and identities of ECNs changes from time to time.

| Example List of ECNs | |
|---|---|
| MPID | Name |
| ARCA | Archipelago |
| BTRD | Bloomberg Trade Book |
| INCA | Instinet |
| ISLD | Island |
| MWSE | Midwest Stock Exchange |
| NTRD | NexTrade |
| REDI | Speer Leeds |

"Exchange" means a national, regional, or international exchange for securities trading including for example, Nasdaq or NYSE.

"Executed," in reference to an order, means that shares have been either bought or sold according to the side of the order.

"Filled" means executed. That is, all shares in the order have been executed, bought or sold according to the side of the order. If an order is subject to partial fulfillment, then the order can be partly filled and partly rejected or cancelled, in which case the order will never be considered filled. Processing of an order can therefore be completed through some combination of cancellation, rejection, killing, and partial execution without the order's ever being filled. Processing of an order is said to be complete when all the shares in the order, share by share, have been executed, cancelled, rejected, or killed.

"Inside price" means, as appropriate, the highest bid price or the lowest ask price for a particular security. For buy orders, the inside price is the lowest ask price. For sell orders, the inside price is the highest bid price.

"Latency" means a measure of the speed with which markets respond to orders and cancellations. Latency in many embodiments of the invention is determined as the difference between the time when a response to an order is received and the time when the corresponding order was routed to the market. Latency can be measured from normal orders or from test orders. Some markets support test orders as such. For markets in which test orders as such are not supported, test orders can be implemented by use of unmarketable orders immediately followed by cancellations. For markets receiving orders regularly, latency can be tracked from normal orders, without the need for test orders. Latency can be embodied as a single ratio difference between two recorded times or as various kinds of averages.

"Level Two Quotes" are quotes that comprise one or more market participant quotes ("MPQs"). The best known source of level two quotes is Nasdaq, but "level two quotes" refers to any form of market information that aggregates market participant quotes for a security.

"Market," "electronic market," "market participant," "electronic market participant," "marketing network," and electronic marketing network" are all used as synonyms for services accessible through electronic communications networks capable of executing orders for securities by accepting from broker-dealers buy orders and sell orders, matching or failing to match buy orders with sell orders, and communicating the results to the broker-dealers. Generally the term "market" is used to refer to these entities. All "markets," as the term is used, are either ECNs or market makers. All available markets have names and symbols as described under the definitions of "ECN" and "market maker."

"Market maker" means a broker-dealer providing order matching and liquidity in a stock by maintaining an inventory of the stock. Market makers typically trade their inventories through exchanges. Some currently active market makers, their symbols and names, are listed below. The number and identity of market makers can change from time to time.

| Example List of Market Makers | |
|---|---|
| MPID | Name |
| BEST | Bear, Stearns & Co., Inc. |
| BTAB | Alex, Brown & Sons, Inc. |
| GSCO | Goldman, Sachs & Co. |
| HMQT | Hambrecht & Quist, LLC |
| HRZG | Herzog, Heine, Geduld, Inc. |
| JANY | Janney Montgomery Scott, Inc. |
| LEHM | Lehman Brothers, Inc. |
| MADF | Bernard L. Madoff |
| MLCO | Merrill Lynch, Pierce, Fenner & Smith Inc. |
| MOKE | Morgan, Keehan & Co., Inc. |
| MONT | Nationsbanc Montgomery Securities, LLC |
| MSCO | Morgan Stanley & Co., Inc. |
| NITE | Knight Securities, L.P. |
| OLDE | Olde Discount Corporation |
| OPCO | CIBC Oppenheimer Corporation |
| PIPR | Piper Jaffray Inc. |
| PRUS | Prudential Securities, Inc. |
| PWJC | Paine Webber, Inc. |
| RAJA | Raymond James & Associates, Inc. |
| SBSH | Smith Barney, Inc. |
| SHRP | Sharpe Capital, Inc. |
| SHWD | Sherwood Securities Corporation |

"Orders" are orders for purchase or sale of securities. In many of the embodiments described, "orders" are electronic orders for purchase or sale of securities.

"Quotes" are aggregates of information regarding securities traded in markets. Quotes include for securities listed for sale or purchase, symbols identifying the securities, price, side, quantities, and market identifications or MPIDs. Quotes can come from exchanges or directly from markets. A "Nasdaq Level Two Quote" includes market information in the form of market participant quotes for all markets offering to buy or sell a particular security through Nasdaq.

"Securities" are any agreement for investment. Stocks are the securities most often addressed in described embodiments of the invention. The invention, however, is applicable to many kinds of securities including, for example, options, commodities, and bonds.

"Side" refers to which side of the market is represented by an order or a quote. Side indicates whether the quote or order is to buy or sell, bid or ask. "Bid" indicates the buy side. "Ask" indicates the sell side. The present invention functions equally for either side of a transaction. Therefore we attempt to speak in neutral terms regarding side. We speak of execution rather than buying or selling. We use the term "price improvement" to indicate both price reductions for buy orders and price increases for sell orders.

DETAILED DESCRIPTION

Turning now to FIG. 1A, a first aspect of the invention is seen. One embodiment illustrated in FIG. 1A provides a method of displaying latency. The embodiment is implemented in a broker-dealer computer system. The system is engaged in automated processing of orders (150) for securities including sending (104) messages (102) to markets (108) and receiving (112) from markets (108) responses (114) to messages.

The illustrated embodiment includes recording (106) for messages sent to markets the time (120) when each message is sent and the identity (118) of the market to which each message is sent, the messages (102) comprising orders (150) and cancellations (148) of orders. This first embodiment includes also recording (110) for responses received from markets the time (122) when each response is received, wherein each response corresponds to a particular message.

This embodiment includes also calculating (124) for at least one market a latency (128) dependent upon at least one recorded time (120) when at least one message is sent to the market and at least one recorded time (122) when a corresponding response is received from the market. The illustrated embodiment includes displaying (130) the identity (118) of the market and the latency (128) for the market. In a further embodiment shown in FIG. 1A, latency (128) is a latency for a port (154), the port being identified by Port ID code (156).

Shown in FIG. 5A is an example of a form of display useful with many embodiments of the invention. The example in FIG. 5A illustrates a columnar display of identities (118) of markets and latency implemented as an instant latency (502) for each market and an average latency (504) for each market.

As shown on FIG. 1A, the display function (130) in many embodiments sends (133) the display (135) to display devices (134) by use of data communications (132). Data communications (132) in some embodiments includes networks, such as intranets, extranets, or internets, and in other embodiments includes satellite channels, direct telephone links, and other forms of data communications. Use of any form of data communications is well within the invention.

Figure 2:
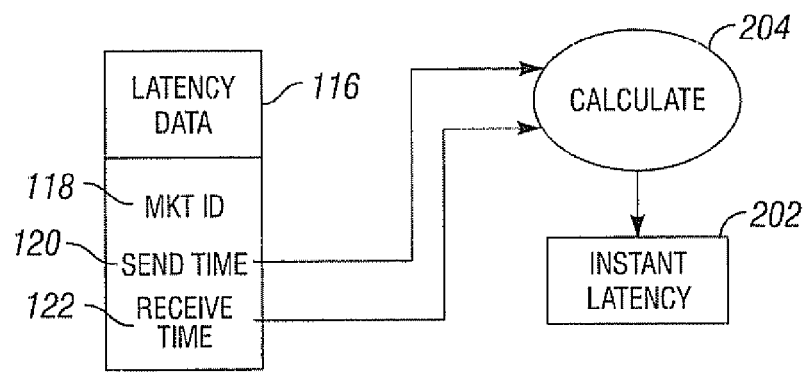
FIG. 2 illustrates calculating instant latency.

In a further embodiment, shown in FIG. 2, latency is implemented as an instant latency (202). The instant latency (202) is calculated (204) dependent upon one recorded time (120) when one message is sent to a market and one recorded time (122) when a corresponding response is received from the market.

Figure 3:
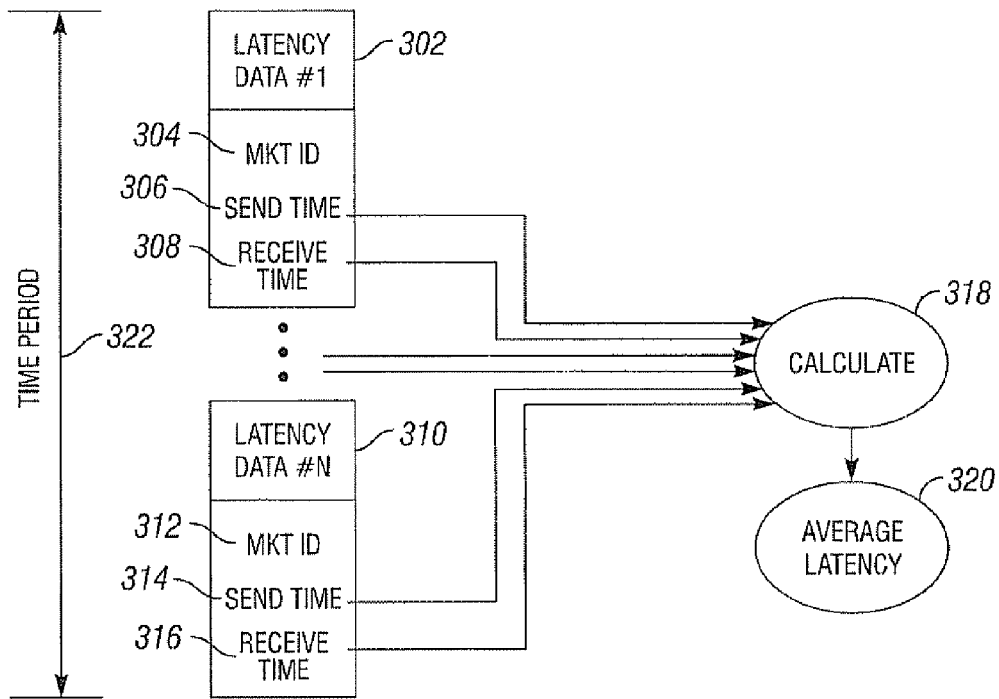
FIG. 3 illustrates an alternative embodiment using average latency.

In a still further embodiment, shown in FIG. 3, latency is implemented as an average latency (320). The average latency (320) is dependent upon at least one recorded time (306, 314) when at least one message is sent to the market and at least one recorded time (308, 316) when a corresponding response is received from the market. In embodiments of the kind shown in FIG. 3, the recorded times (306, 308, 314, 316) used in calculating the average latency (320) are recorded during a defined period of time (322).

Figure 4:
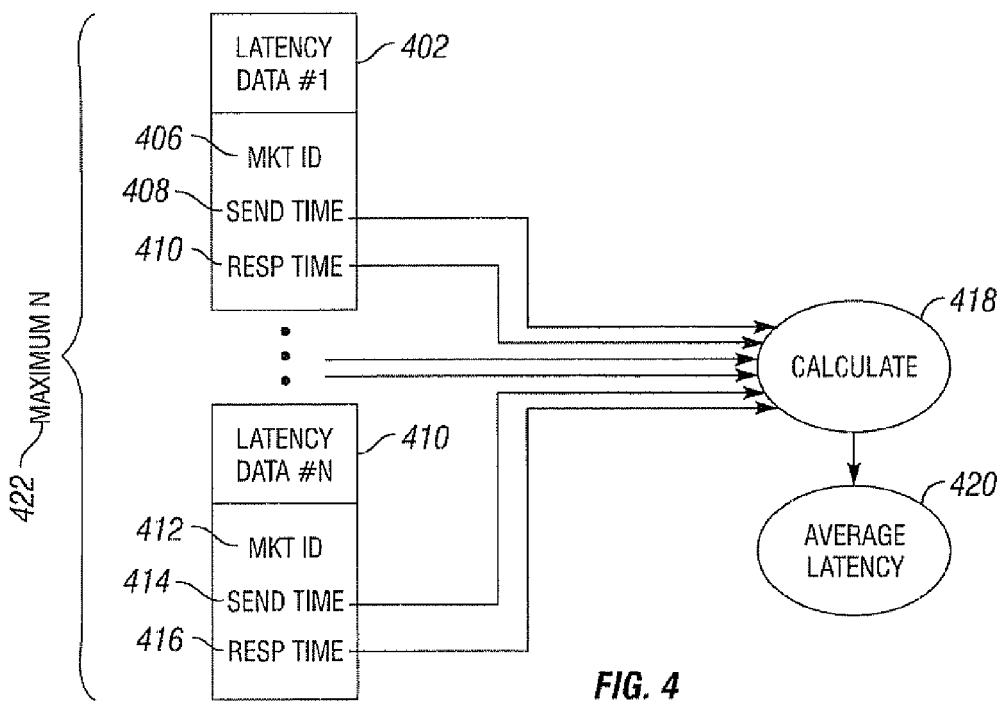
FIG. 4 illustrates another alternative embodiment using average latency.

In a further embodiment, shown in FIG. 4, the latency is implemented as an average latency (420). The average latency is dependent upon at least one recorded time (408, 414) when at least one message is sent to the market and at least one recorded time (410, 416) when a corresponding response is received from the market. In embodiments shown in FIG. 4, the number of recorded times (408, 410, 414, 416) used to calculate the average latency (420) is limited to a defined maximum number "N" (422). In many embodiments of this kind, the N recorded times used to calculate average latency are the N most recent recorded times.

A further embodiment shown in FIG. 1A includes the steps of counting (136) the number of messages sent to at least one market during a period of time, including storing in computer memory (140) the number of messages (144) sent to the market during the period of time. In many embodiments of this kind, the counting steps (138, 136) determine time periods in dependence upon a computer system clock (170).

The illustrated embodiment includes also counting (138) the number of responses received from the market during the period of time, including storing in computer memory (140) the number of responses (146) received from the market during the period of time. The embodiment includes also displaying (130), in addition to the identity (118) of the market and the latency (128) for the market, the number of messages (144) sent to the market and the number of responses (146) received from the market during the period of time.

FIG. 5C shows an example of a display useful with various embodiments using such displays display in columnar form the market identities (118), latencies (320), number of messages sent during a period of time (144), and the number of responses received during a period of time (146). As shown on FIG. 1A, the display function (130) in many embodiments sends (133) the display (135) to display devices (134) by use of data communications (132). Data communications (132) in some embodiments includes networks, such as intranets, extranets, or internets, and in other embodiments includes satellite channels, direct telephone links, and other forms of data communications. Use of any form of data communications is well within the invention.

An example of the use of message counts for diagnostic purposes is a display showing an increase in latency for a port explained by an increase in message counts for the port, thus indicating the port slowed down because its work load increased, and indicating also that there is no problem with the system. Another example is a display showing an increase in latency for a port explained by the port's message count going to zero, thus indicating that the increase in latency is caused by a catastrophic failure of the port.

In a further embodiment, shown in FIG. 1A, the system includes the steps of counting (136) the number of messages sent to a market through a port (154) during a period of time, including storing in computer memory (140) the number of messages (144) sent to the market through the port during the period of time. In many embodiments of this kind, the counting steps (138, 136) determine time periods in dependence upon a computer system clock (170).

The illustrated embodiment includes also counting (138) the number of responses received from the market through the port during the period of time, including storing in computer memory (140) the number of responses (146) received from the market through the port during the period of time. The system includes also displaying (130), in addition to the identity (118) of the market and the latency (128) for the market, the number of messages (144) sent to the market through the port and the number of responses (146) received from the market through the port during the period of time.

FIG. 5B shows an example of a display useful with various embodiments of the invention. Embodiments using such displays display in columnar form the market identities (118), port identity codes (154), instant latencies (202), average latencies (320), number of messages sent during a period of time (144), and the number of responses received during a period of time (146).

As shown on FIG. 1A, the display function (130) in many embodiments sends (133) the display (135) to display devices (134) by use of data communications (132). Data communications (132) in some embodiments includes networks, such as intranets, extranets, or internets, and in other embodiments includes satellite channels, direct telephone links, and other forms of data communications. Use of any form of data communications is well within the invention.

Figure 6:
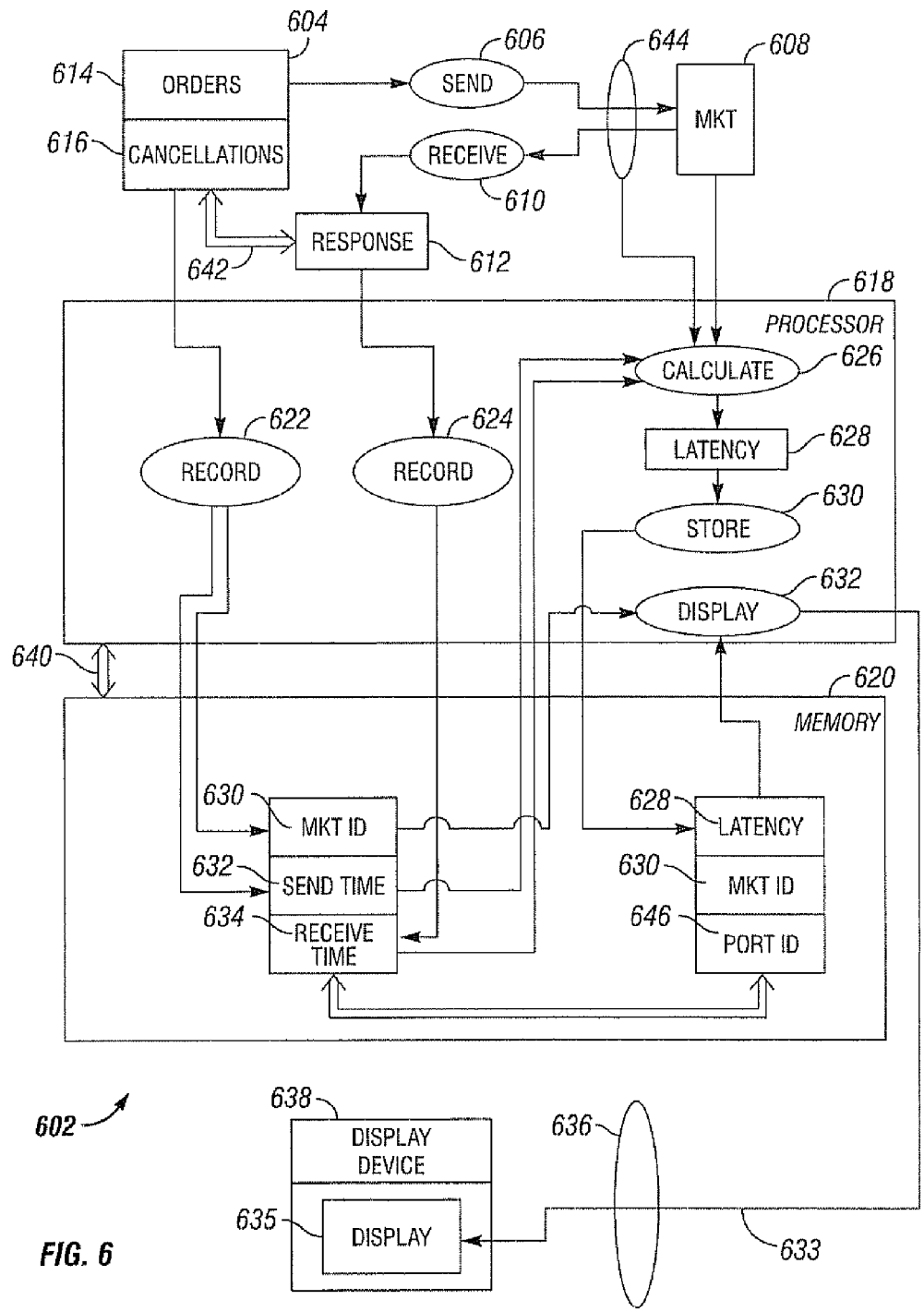
FIG. 6 illustrates computing machinery for various alternative embodiments of the invention.

Turning now to FIG. 6, an additional aspect of the invention is seen. One embodiment shown in FIG. 6 is automated computing machinery implementing a broker-dealer computer system (602). The illustrated embodiment is capable of automated processing of orders for securities, including sending (606) messages (604) to markets (608) and receiving (610) from markets (608) responses (612) to messages.

The illustrated embodiment includes at least one computer processor (618) programmed to record (622) in computer memory (620), for messages sent to markets, the time (632) when each message is sent and the identity (630) of the market (608) to which each message is sent, the messages including orders (614) and cancellations (616) of orders. In this embodiment, the processor is programmed also to record (624), in computer memory (620), for responses (612) received (610) from markets, the time (634) when each response is received. Each response (612) corresponds (642) to a particular message (604).

In this example embodiment, the processor is programmed also to calculate (626), for at least one market (608) a latency (628) dependent upon at least one recorded time (632) when at least one message is sent to the market and at least one recorded time (634) when a corresponding response is received from the market. In this embodiment, the processor is programmed also to display (632) of the identity (630) of the market and the latency (628) for the market. In a further embodiment shown in FIG. 6, latency (628) for a market (608) is also latency for a port (644), the port being identified in data by a port ID code (646).

As shown on FIG. 6, the display function (632) in many embodiments sends (633) the display (635) to display devices (638) by use of data communications (636). Data communications (636) in some embodiments includes networks, such as intranets, extranets, or internets, and in other embodiments includes satellite channels, direct telephone links, and other forms of data communications. Use of any form of data communications is well within the invention. The embodiment illustrated in FIG. 6 includes also computer memory (620) coupled (640) to the processor (618), the processor being further programmed to store (630) in computer memory (620) the latency (628).

Figure 7:
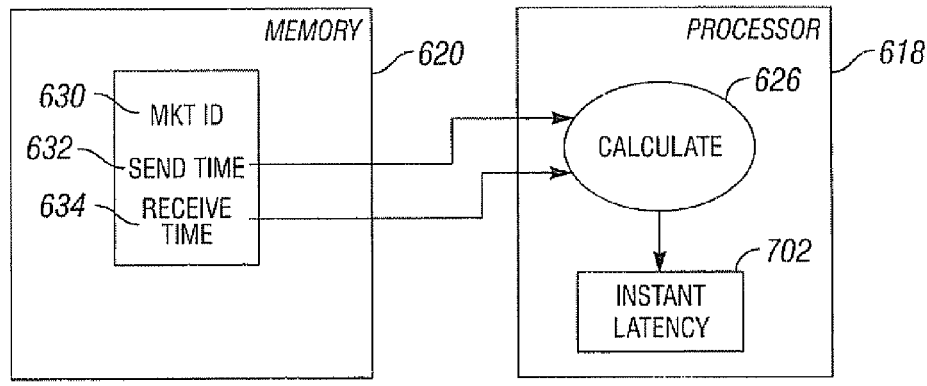
FIG. 7 illustrates computing machinery programmed to calculate instant latency.

In a further embodiment shown in FIG. 7, latency comprises an instant latency. In the embodiment of FIG. 7, the processor (618) is programmed to calculate (626) latency as an instant latency (702) calculated dependent upon one recorded time (632) when one message is sent to a market and one recorded time (634) when a corresponding response is received from the market.

In some embodiments, the processor is programmed to calculate latency as an average latency dependent upon at least one recorded time when at least one message is sent to the market and at least one recorded time when a corresponding response is received from the market. In such embodiments, as illustrated in FIG. 3, recorded times (306, 308, 314, 316) used in calculating the average latency (320) are recorded during a defined period of time (322).

In other embodiments, the processor is programmed to calculate latency as an average latency dependent upon at least one recorded time when at least one message is sent to the market and at least one recorded time when a corresponding response is received from the market. In such embodiments, as shown in FIG. 4, the number of the recorded times (408, 410, 414, 416) used to calculated the average latency is limited to a defined maximum number "N" (422). In many embodiments of this kind, the N recorded times used to calculate average latency are the N most recent recorded times.

Figure 8:
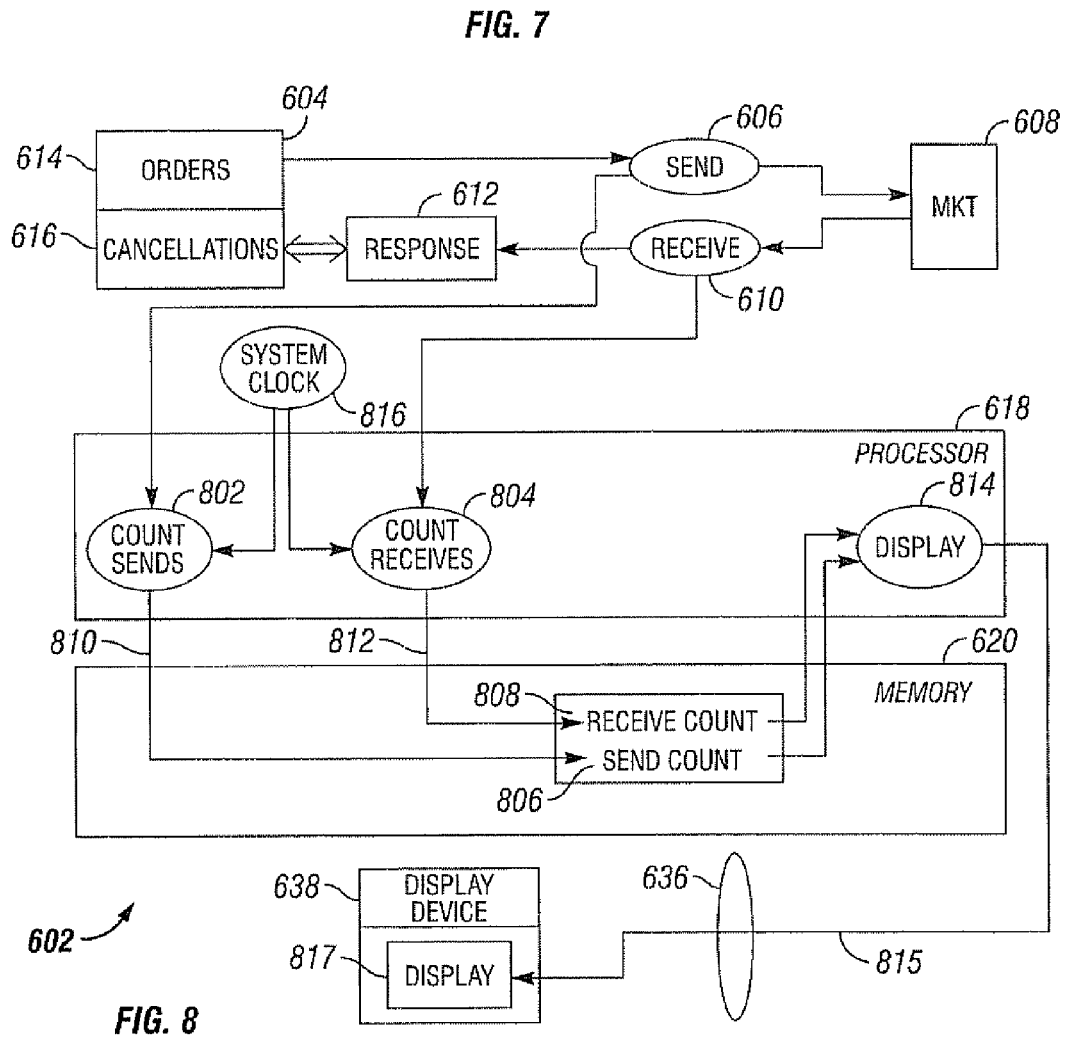
FIG. 8 illustrates computing machinery programmed to count and display the number of messages and responses received and sent during a period of time.

In a further embodiment shown in FIG. 8, latency comprises an average latency. In embodiments of the kind shown in FIG. 8, the processor (618) is further programmed to count (802) the number (806) of messages (604) sent (606) to at least one market (608) during a period of time, including storing in computer memory (620) the number of messages (806) sent to the market during the period of time. Periods of time in many embodiments are determined dependent upon a system clock (816).

The processor in many embodiments of the kind illustrated in FIG. 8, is also programmed to count (804) the number (808) of responses (612) received (610) from the market (608) during the period of time, including storing in computer memory (620) the number of responses (808) received from the market during the period of time. The system includes also displaying (814), in addition to the identity of the market and the latency for the market, the number of messages (806) sent to the market and the number of responses (808) received from the market during the period of time.

FIG. 5C shows an example of a display useful with various embodiments of the invention. Embodiments using such displays display in columnar form the market identities (118), latencies (320), number of messages sent during a period of time (144), and the number of responses received during a period of time (146). As shown on FIG. 8, the display function (814) in many embodiments sends (815) the display (817) to display devices (638) by use of data communications (636). Data communications (636) in some embodiments includes networks, such as intranets, extranets, or internets, and in other embodiments includes satellite channels, direct telephone links, and other forms of data communications. Use of any form of data communications is well within the invention.

Figure 9:
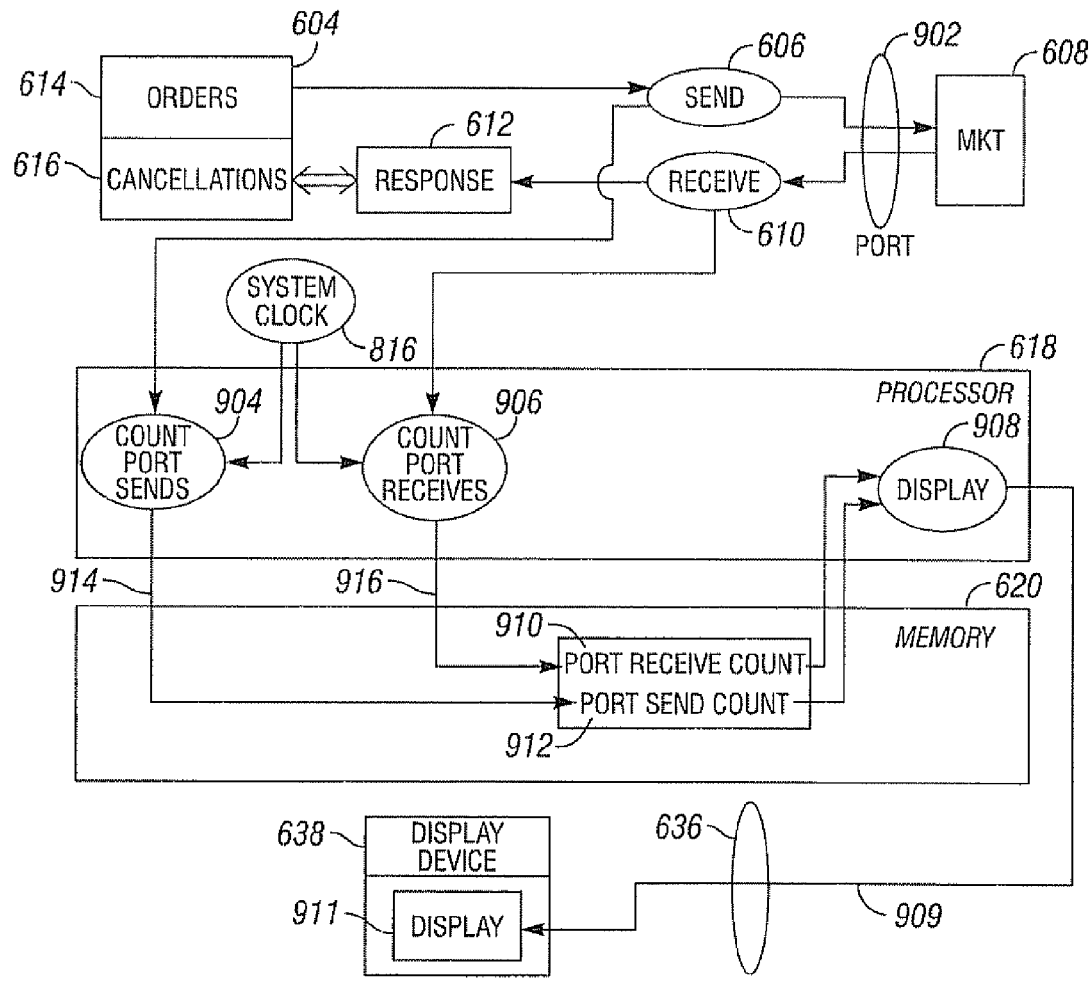
FIG. 9 illustrates computing machinery programmed to count and display the number of messages and responses received and sent through a port during a period of time.

In a further embodiment shown in FIG. 9, the processor (618) is programmed to count (904) the number of messages (604) sent to a market (608) through a port (902) during a period of time, including storing (914) in computer memory (620) the number of messages (912) sent to the market (608) through the port (902) during the period of time. Periods of time in such embodiments typically are determined dependent upon a system clock (816).

The processor in many embodiments of the kind illustrated in FIG. 9 is also programmed to count (906) the number of responses (612) received (610) from the market (608) through the port (902) during the period of time, including storing (916) in computer memory (620) the number of responses (910) received from the market (608) through the port (902) during the period of time. The embodiment as illustrated includes also displaying (908), in addition to the identity (630 on FIG. 6) of the market and the latency (628 on FIG. 6) of the market, the number of messages (912) sent to the market (608) through the port (902) and the number of responses (910) received from the market (608) through the port (902) during the period of time.

FIG. 5B shows an example of a display useful with various embodiments of the invention. Embodiments using such displays display in columnar form the market identities (118), port identity codes (154), instant latencies (202), average latencies (320), number of messages sent during a period of time (144), and the number of responses received during a period of time (146). As shown on FIG. 9, the display function (908) in many embodiments sends (909) the display (911) to display devices (638) by use of data communications (636). Data communications (636) in some embodiments includes networks, such as intranets, extranets, or internets, and in other embodiments includes satellite channels, direct telephone links, and other forms of data communications. Use of any form of data communications is well within the invention.

What is claimed is:

1. A method of displaying latency, the method implemented in a broker-dealer computer system, the system being engaged in automated processing of orders for securities including sending messages to markets and receiving from markets responses to messages, the method comprising:
   recording for messages sent to at least two different markets the time when each message is sent and the identity of the market to which each message is sent, the messages comprising orders;
   recording for responses received from said markets the time when each response is received, wherein each response corresponds to a particular message of said messages;
   calculating for at least a first market a first latency dependent upon at least one recorded time when at least one message is sent to the first market and at least one recorded time when a corresponding response is received from the first market;
   calculating for a second market a second latency dependent upon at least one recorded time when at least one message is sent to the second market and at least one recorded time when a corresponding response is received from the second market;
   displaying on a device the identity of the first market and the latency for the first market; and
   displaying the identity of the second market and the latency for the second market.

2. The method of claim 1 wherein the first latency further comprises latency for a port.

3. The method of claim 2, where an absence of responses indicates failure of said port.

4. The method of claim 1, wherein the first latency comprises an instant latency calculated dependent upon one recorded time when one message is sent to the first market and one recorded time when a corresponding response is received from the first market.

5. The method of claim 1 wherein the first latency comprises an average latency dependent upon at least one recorded time when at least one message is sent to the first market and at least one recorded time when a corresponding response is received from the first market, wherein all the recorded times used in calculating the first latency are recorded during a defined period of time.

6. The method of claim 5, said average latency dependent upon at least two recorded times when at least two messages are sent to the first markets and at least two recorded times when corresponding responses are received from the first market.

7. The method of claim 1 wherein the first latency comprises an average latency dependent upon at least one recorded time when at least one message is sent to the first market and at least one recorded time when a corresponding response is received from the first market, wherein the number of recorded times used to calculate the average latency is limited to a defined maximum, and is more than one.

8. The method of claim 1 wherein the first latency comprises an average latency dependent upon at least one recorded time when at least one message is sent to the first market and at least one recorded time when a corresponding response is received from the first market, wherein the calculating uses the latest recorded time when a message is sent to the first market and the latest recorded time when a corresponding response is received from the first market, and wherein the number of recorded times used to calculated the average latency is limited to a defined maximum.

9. The method of claim 1 further comprising the steps of:
   counting the number of messages sent to at least one market during a period of time, including storing in computer memory the number of messages sent to the first market during the period of time;
   counting the number of responses received from the at least one market during the period of time, including storing in computer memory the number of responses received from the first market during the period of time; and
   displaying, in addition to the identity of the first market and the first latency for the market, the number of messages sent to the first market and the number of responses received from the first market during the period of time.

10. The method of claim 1 further comprising the steps of:
   counting the number of messages sent to a market through a port during a period of time, including storing in computer memory the number of messages sent to the first market through the port during the period of time;
   counting the number of responses received from the first market through the port during the period of time, including storing in computer memory the number of responses received from the market through the port during the period of time; and
   displaying, in addition to the identify of the first market and the first latency for the first market, the number of messages sent to the first market through the port and the number of responses received from the first market through the port during the period of time.

11. The method of claim 1, further comprising:
   selecting one of said first and second markets based on said calculations for said first latency and said second latency.

12. The method of claim 1, said messages further comprising cancellations of orders.

13. The method of claim 1, said step of displaying being to a customer who originates at least one of said messages and selects one of said markets after said step of displaying.

14. The method of claim 1, said response indicating that at least one of said orders has been filled.

15. The method of claim 1, said response indicating that at least one of said orders has not been filled.

* * * * *